Jan. 24, 1956    H. W. HORNKE    2,731,759
FISH NET FLOAT
Filed Oct. 30, 1952

INVENTOR.
HOWARD W. HORNKE
BY
Fay & Fay
ATTORNEYS

United States Patent Office 2,731,759
Patented Jan. 24, 1956

2,731,759
FISH NET FLOAT
Hugo W. Hornke, Cleveland, Ohio

Application October 30, 1952, Serial No. 317,615

2 Claims. (Cl. 43—43.1)

This invention, relating as indicated to a fish net float, is more particularly directed to a novel type of float which will be useful particularly for gill net fishing, to maintain the net near the surface of the water and to be secured with twine to the net and the principal support rope of the net in such a manner that it will not become dislodged and lost.

In commercial fishing today, particularly in inland bodies of water, a large quantity of nets are used, and a single boat may have as much as four to ten miles of nets, which it will periodically lay and pick up. Realizing that the nets must be supported by floats at intervals for gill nets of about 8 to 15 feet, it may readily be seen that a large number of floats are regularly used. These floats must be able to provide the proper amount of buoyancy and should not become water logged, as wooden ones frequently do. In addition they must be easily fastened and re-fastened to the net because once every year they must be tied onto the net and untied again in the fall. In use, they are likely to become loose through the continual pull over a drum so that they may snap off. From this it can be seen that one of the most important things is the amount of labor and the cost of the labor for tying and untying floats. A single boat may have as many as 10,000 floats and it is a very time consuming process to tie these floats to the net. This is particularly so when new type floats are used, which are improvements of old wooden floats but are so expensive that more secure tying means must be provided, in order to lessen the chance of loss.

It is frequently the practice with plastic floats to provide two lines, a single line tied through the float which has a tubular bore and a long line tied at a greater distance from each end of the float to the net. In the event the drum of the fishing boat, or other means, breaks or causes a single line to untie, the float will not be lost. In view of the high cost of these floats it is extremely expensive to replace them if a great number are lost in a single day's fishing.

As an improvement of present-day floats, the disclosed construction provides for proper buoyance, long life, together with easy means for tying the float, and the construction adapts itself to the pulling of the drum so that the drum will not scrape off or strip off the floats in reeling in the nets.

An object of my invention is to produce a novel construction of a float with proper buoyancy and easy means for tying to the net.

A further object of my invention is to produce a fish net float with a number of openings in the float angulated with respect to the tubular body of the float in order that a pull on the net will not cause undue strain on the twine holding the float.

A further object of the invention is to provide a tubular float with a rounded nose, with tying means therefor, which will not become entangled with the twine of the float and which may be readily fastened thereto.

To the accomplishment of the foregoing and related ends, said invention then consists of the means hereinafter fully described and fully pointed out in the claims, the following description setting forth in detail one preferred means of carrying out the invention, such disclosed means, however, constituting but one of the various ways in which the principles of the invention may be used.

Figure 1:
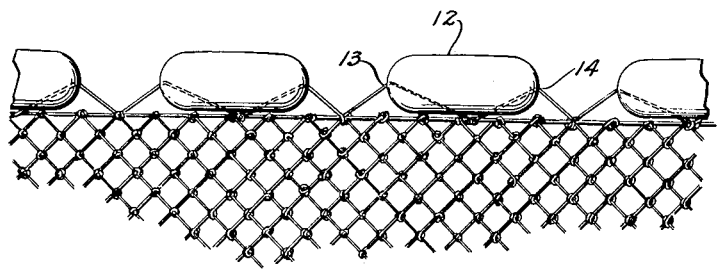
Fig. 1 is a partial plan view of a gill net having floats secured thereto.

This new and improved invention consists of tubular body members 10 and 11, preferably of hollow elongated construction having smooth rounded ends merging into the surface of the sides of said body. The body member of this construction may be made of plastic, though certain metals might be used. Said invention consists of a fish net float of usual shape and size shown generally at 12, as used for gill net fishing, which consists of a body approximately 4¾ inches long and has an outer diameter about 1⅞ inches and an aperture or tubular bore therein which permits twine to be passed through the float to tie the float to a fish net, whereby the net may be suspended in water. My improved construction consists of a float 12 of approximately said dimensions and having tubular body members 10 and 11, either tapered slightly to the ends or straight, in which there are openings or tubular bores 13 and 14 for the twine, said openings being approximately ⅜ inch in internal diameter and being formed to project inwardly from rounded nose portions 15 and 16 respectively at each end of the float, said openings passing from the immediate vicinity of the rounded noses to the sides of the tubular body at 17 and 18 respectively. Thus said openings provide for almost a continual passage from one end of the float to the other, first through opening 13 to the side at 17, and then along the outside of the float to the other opening at 18, and consequently to the end opening 14. The side openings may be in immediate proximity of one another and, in fact, contiguous. As may be seen in the drawings, said openings or tubular bores 13 and 14 may be on opposite sides of the transverse center line of said body.

Figure 2:
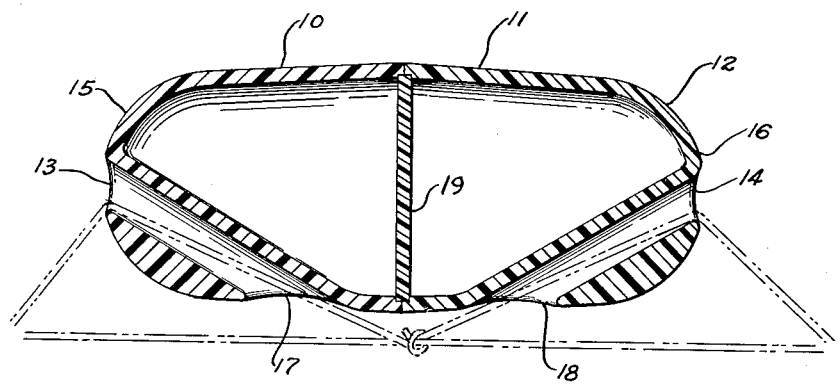
Fig. 2 is an enlarged cross-sectional view of a float of this invention together with the securing means for attaching the same to a net, said view being taken along the lines 2—2 of Fig. 3.
Figure 3:
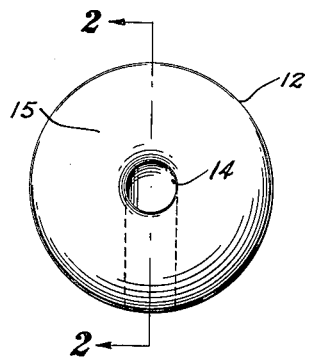
Fig. 3 is an end view of the float.

Fig. 2 further shows a reinforcing plate member extending transversely in said body at the junction of the two similar sections 10 and 11. Said plate is designated 19.

This new and improved construction is of extreme simplicity in connection with the tying of the float, which can be a tedious job, particularly in the beginning of the season when time is altogether too short and a day or two days spent tying floats to the nets is particularly troublesome to a fisherman. This construction provides for easy tying by permitting twine, such as seaming twine, to be tied to the fish net at one point passed through a single end opening, to the side opening where it is tied again, and then through the other opening out through the rounded nose, where it will again be tied to the net. It is possible, of course, to tie the float in a number of places, perhaps as many as four, but a double tie is provided with only three knots by this construction. By this it is meant that with three ties onto the maitre cord of the net the float will not be lost. This saves all the time involved in tying the extra knots by the construction previously disclosed, where two complete lines must be passed through the tubular center of the float to secure the float by two separate ropes to the maitre cord of the net.

A further advantage of this construction is that the angulated opening through the tubular body from the end to the side, permits a direct pull on the float and the fish net. Thus, there is no sharp turn or sharp ends which will rub and cause the lines to break. In any event if a single loop of the line, securing the float to the net, should break through some unforeseen circumstance, there is still another loop attached through an opening securing the float to the net. This construction saves at least 25% of the labor of tying.

A further object of this construction is that the float may be made of moldable material, such as plastic, and be supported in the center by a disc of circular plate which will support the outer tubular body, provide the proper buoyancy and the strength in the event that the float should, through some accident, be forced into deep water. Under these conditions floats have been known to collapse and, of course, in this event are useless. My new and improved construction is stronger, has a center circular plate and is particularly resistant to the crushing action of water at great depths.

I wish it to be understood that I do not confine myself to the precise details herein set forth in the preferred means of carrying out my invention as it is apparent that many changes and variations may be made by those skilled in the art without departing from the spirit of the invention or exceeding the scope of the appended claims.

I claim:

1. A fishing net float comprising a hollow elongated body having smooth rounded ends merging into the surfaces of the sides of said body and having tubular bores formed therein which extend from the center of the ends of the body diagonally toward each other and which terminate at one side of the body in close proximity to each other adjacent to and on opposite sides of the transverse center line of said body, said body being formed of such a configuration that the exterior surface thereof is devoid of external projection.

2. A fishing net float as set forth in claim 1, wherein the body is formed of two similar sections secured together and a reinforcing plate extends transversely of said body at the juncture of said sections.

References Cited in the file of this patent

UNITED STATES PATENTS

| | | |
|---|---|---|
| 739,324 | Koenig | Sept. 22, 1903 |
| 879,941 | Botkin | Feb. 25, 1908 |
| 2,154,112 | Seefeldt | Apr. 11, 1939 |
| 2,269,615 | Walker | Jan. 13, 1942 |
| 2,315,322 | Fenley | Mar. 30, 1943 |
| 2,492,033 | Cherriere | Dec. 20, 1949 |
| 2,527,956 | Peevey | Oct. 31, 1950 |
| 2,609,634 | Simpson | Sept. 9, 1952 |